April 9, 1940.  W. RODDER ET AL  2,196,684
AUTOMATIC SIDE GUIDE FOR SHEAR TABLES
Filed Oct. 19, 1938   4 Sheets-Sheet 1
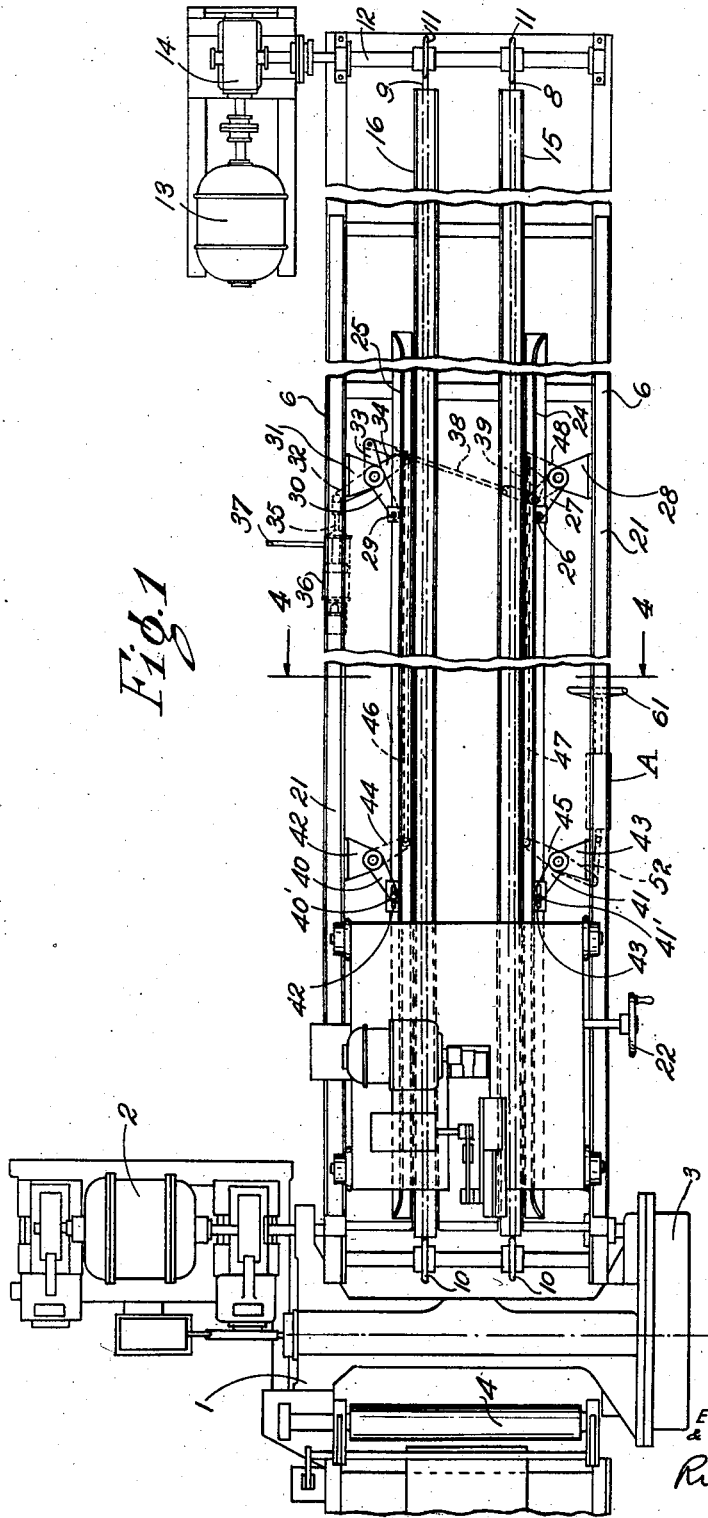
INVENTORS
ELWIN A. MATTESON
& WILLIAM RODDER
Richey & Watts
ATTORNEYS April 9, 1940.  W. RODDER ET AL  2,196,684
AUTOMATIC SIDE GUIDE FOR SHEAR TABLES
Filed Oct. 19, 1938  4 Sheets-Sheet 2
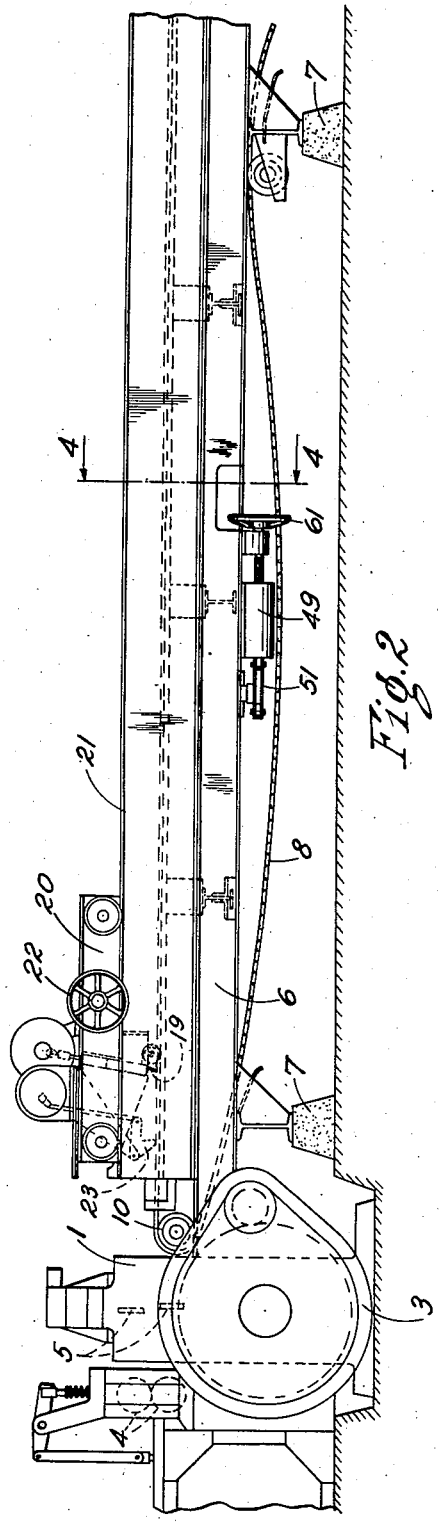
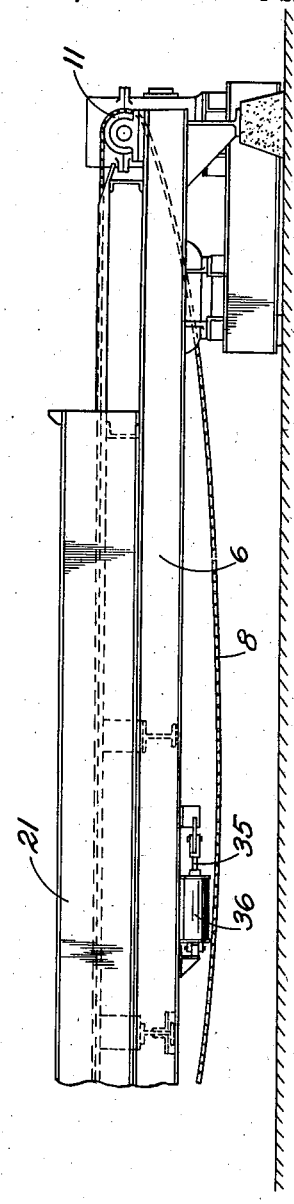
INVENTORS
ELWIN A. MATTESON
WILLIAM RODDER
BY
Richey & Watts
ATTORNEYS April 9, 1940.   W. RODDER ET AL   2,196,684
AUTOMATIC SIDE GUIDE FOR SHEAR TABLES
Filed Oct. 19, 1938   4 Sheets-Sheet 3
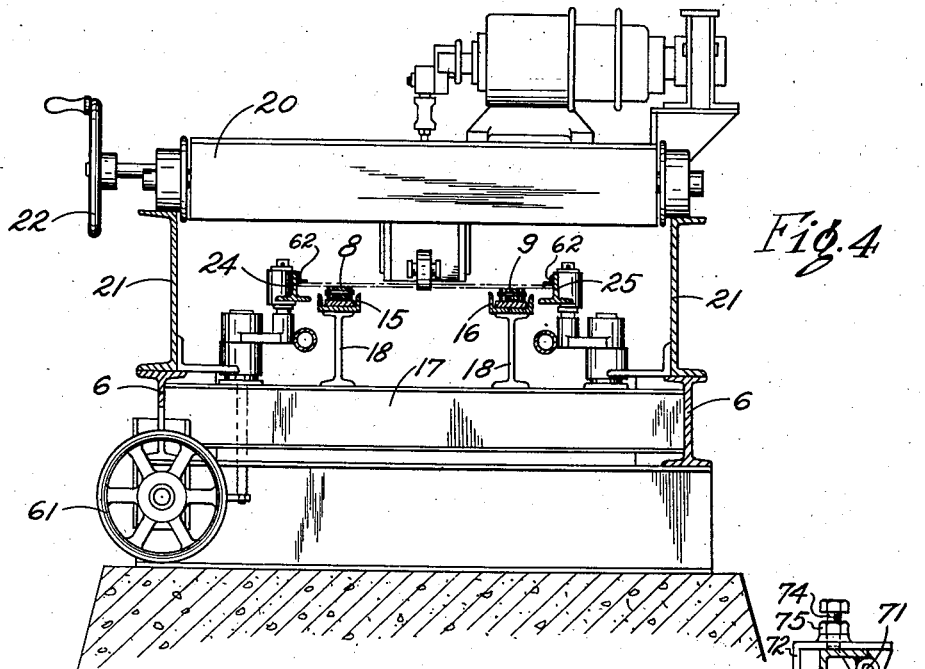
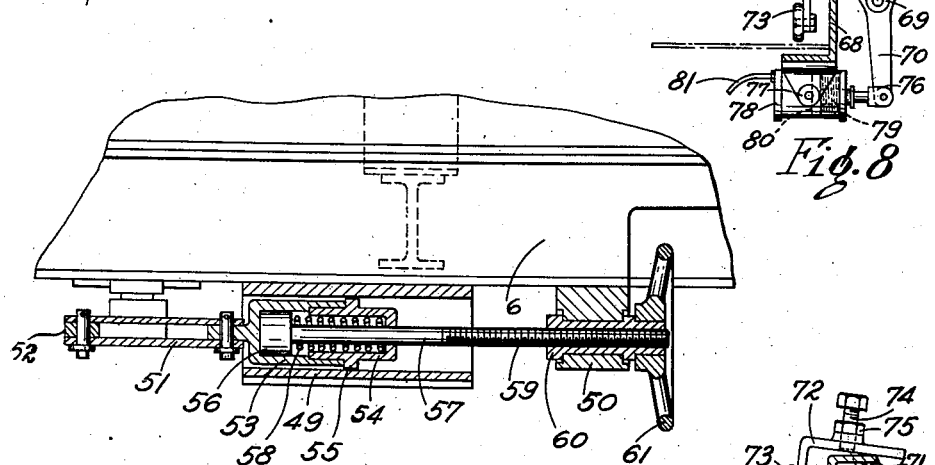
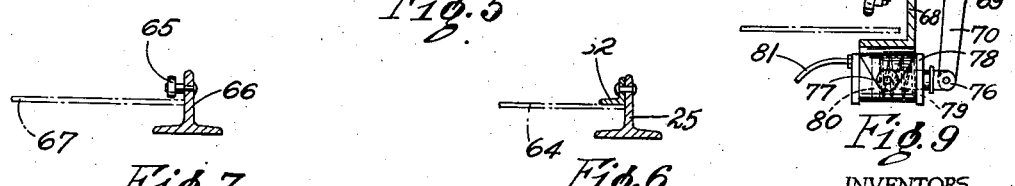
INVENTORS
ELWIN A. MATTESON
& WILLIAM RODDER
BY *Richey Watts*
ATTORNEYS

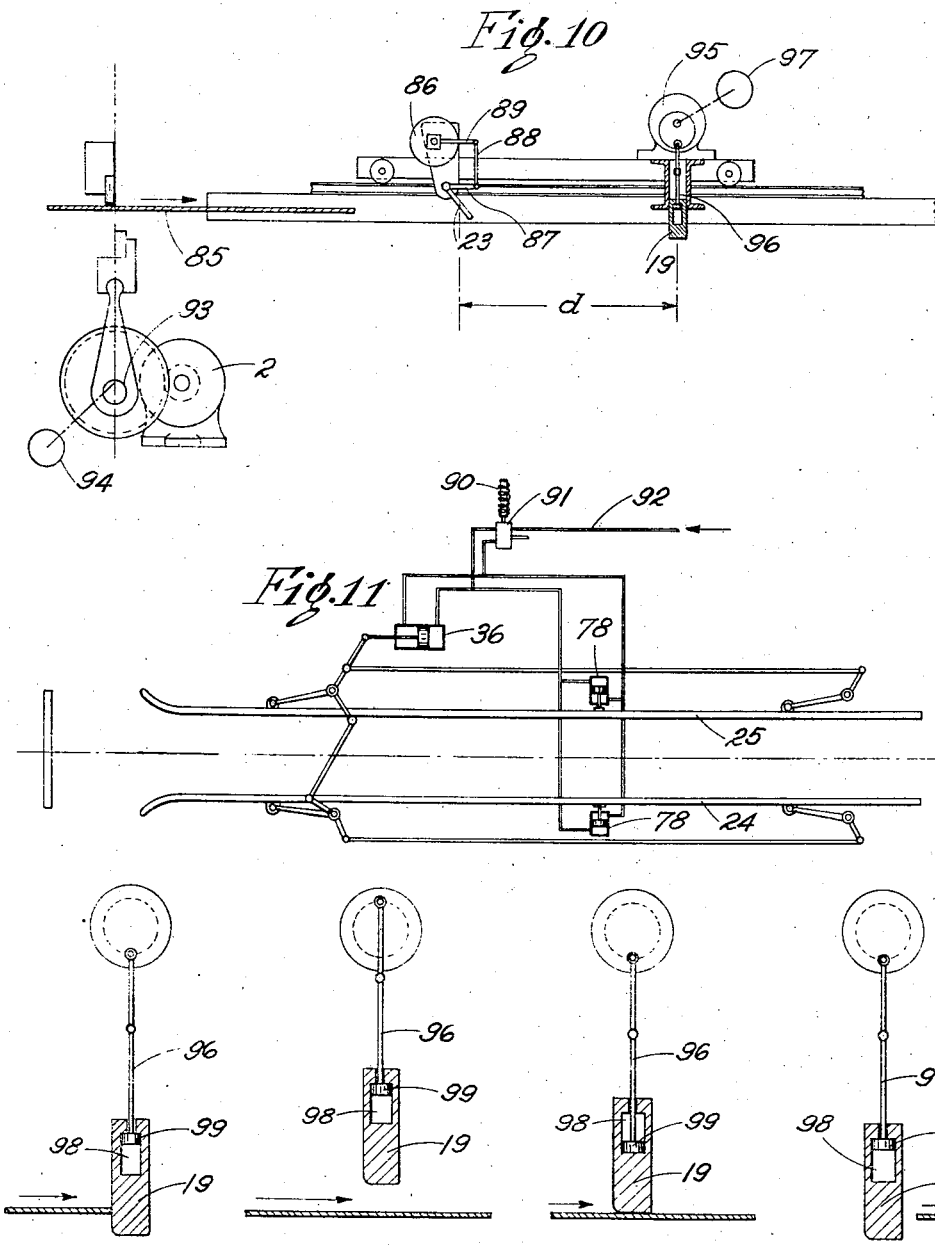

Patented Apr. 9, 1940

2,196,684

UNITED STATES PATENT OFFICE

2,196,684

AUTOMATIC SIDE GUIDE FOR SHEAR TABLES

William Rodder and Elwin A. Matteson, Youngstown, Ohio, assignors to The Aetna Standard Engineering Company, Youngstown, Ohio, a corporation of Ohio Application October 19, 1938, Serial No. 235,826

12 Claims. (Cl. 164—34)

This invention relates to the art of cutting strip material into accurate lengths and more particularly to an improved apparatus for assuring that the shear cut ends are square with the sides of the cut pieces.

Prior to our invention it has been a general practice in the shearing of strip metal into cut lengths to uncoil the material from a coil and feed the strip through a shear onto a run-out table where the length of cut is determined and the material then sheared off. In installations of this type a number of difficulties have been encountered, among which are sidewise movement of the strip on the table causing unsquare sheared ends of the cut pieces and buckling of the material between the gauge stop and the shear with resulting irregular lengths of the sheared material. It has not been found practical to use stationary side guides on the run-out table to hold the material in perpendicular relation to the shear knife because such stationary guides, when close enough to be effective in holding the strip square with the shear, set up a seriously objectionable resistance to the free travel of the material over the table.

It is among the objects of our invention to provide means for cutting strip material into extremely accurate lengths with accurately squared ends. Other objects of our invention are the provision of a side guide mechanism for a shear run-out table which will offer a minimum of resistance to the travel of the material over the table but which will automatically be actuated to square up the material with the shear when the shear cut is made; the provision of a simple, rugged, automatic side guide for insuring squared ends of strip when cut into lengths; and the provision of side guides which are adapted to prevent buckling of the strip on the run-out table thus preventing irregular lengths of the sheared material.

The above and other objects of our invention will appear from the following description of one form of shear and run-out table incorporating our improvements, reference being had to the accompanying drawings, in which—

Figure 1 is a plan view of a shear and run-out table showing our squaring guides;

Figure 2 is a partial side elevation of the apparatus shown in Figure 1.

Figure 3 is a continuation of Figure 2 showing the exit end of the run-out table.

Figure 4 is a vertical cross-sectional view taken on line 4—4 of Figures 1 and 2.

Figure 5 is an enlarged fragmentary cross-sectional view of the mechanism for adjusting the squaring guides to different strip widths.

Figure 6 is an enlarged fragmentary cross-sectional view of one of the side guides showing a flange type buckling guard in position.

Figure 7 is a view similar to Figure 6 illustrating a roller type of buckling guard.

Figure 8 illustrates an air operated buckling guard in working position.

Figure 9 illustrates the guard of Figure 8 in released position.

Figure 10 is a diagrammatic elevational view showing the control operating trip or trigger, the measuring stop, and their associated parts together with the shear and control switch operated by the movement thereof.

Figure 11 is a diagrammatic plan view showing the fluid pressure operating hook-up for the air cylinders and illustrating the solenoid actuated valve for controlling the operation of the cylinder.

Figure 12 is a fragmentary diagrammatic view of the measuring stop support and operating connections, with the sheet just engaging the stop.

Figure 13 is a view similar to Figure 12 but showing the stop in elevated position to permit the severed sheet to run out through the machine.

Figure 14 is a view generally similar to Figure 12 but illustrating the stop riding upon the severed sheet and with the operating crank for the stop in its lowest position.

Figure 15 is a view similar to Figure 12 but showing the position of the parts just after the sheet has moved beyond the stop and before the next sheet end has struck the stop.

Referring now to the drawings, the shear, which may be of any suitable type, is carried by the housing 1 and is adapted to be driven by the motor 2 through suitable gearing enclosed in the gear box 3. The strip is fed to the shear through the guide rolls 4 and the shear blades are diagrammatically indicated at 5 in Figure 2. The run-out table on which the pieces are measured for length and which removes the severed sheets includes longitudinally extending frame members 6 supported on suitable foundations 7. The strip and cut sheets are moved over the run-out table by means of conveyor chains 8 and 9 upon which the material rests. These chains engage and are supported by sprockets 10 and 11 which are mounted on transverse shafts carried by the frame 6. The sprockets 11 and the shaft 12 on which they are supported are driven by a motor 13 acting through a gear box 14 and thus chains 8 and 9 will each be driven at the same speed in well known manner. To form a level support for the material being handled the chains 8 and 9 are carried in channels 15 and 16 respectively. These channels are supported on the transverse members 17 of the frame 6 by I-beam sections 18.

The gauge stop which determines the length into which the pieces of material are cut is shown at 19 in Figure 2. This stop is carried on a movable carriage 20 supported on a pair of track members 21 which in turn are mounted on the side members 6 of the run-out table frame. The length of cut is determined by the position of the carriage 20 on the tracks 21 and this may be varied by rotating the hand wheel 22 which is connected in any suitable and well known manner (not shown) to move the carriage 20 along the track 21. As illustrated, the carriage 20 is positioned quite close to the shear 1 and the stop gauge 19 is set to cut rather short pieces. This position of the carriage is shown in the drawings because it permits of clearer illustration of our improved side guide structure. Also mounted on the carriage 20 is the trip or trigger member 23 which is adapted to be engaged by the advancing end of the strip and lifted thereby to actuate the control devices which cause our squaring side guides to grip the strip, the cutting shear to operate to sever the piece and the gauge stop 19 to be lifted out of the path of the strip so that the severed piece can be conveyed along the table, the side guides released and the apparatus reset for the next cycle. It will be seen that the trip 23 is in advance of the gauge stop 19. As is well known in the art, the control mechanisms (not shown) are so designed that the shear blades 5 will not sever the piece until the end reaches the gauge stop 19. Furthermore, our squaring guides (more fully described later) do not grip the sides of the strip until it has struck the gauge stop 19.

As is best seen in Figure 1, we provide parallel longitudinally extending side guide members 24 and 25. These may conveniently be inverted T-section members, the upstanding portions of which are adapted to engage the sides of the strip. These side guides 24 and 25 are maintained exactly perpendicular to the shear blades 5 and thus, when the guides 24 and 25 are caused to grip the side edges of the strip, the end cut of the shear blades must necessarily be square with the sides and a perfectly square piece will result. The guide 24 is pivotally mounted upon a pin 26 carried by the arm 27 of a lever assembly which is pivotally mounted on a bracket 28 secured to one of the table side members 6. The opposite side guide 25 is similarly pivotally supported on a pin 29 carried by an arm 30 which is pivotally supported on the bracket 31 secured to the opposite side member 6. The arm 30 forms part of an integral group of levers or arms which are designated by the characters 32, 33 and 34. All of these arms move together and are pivotally supported upon the bracket 31. The arm 32 is connected to the end of a piston rod 35 which in turn is secured to a piston in the cylinder 36 for purposes to be later described. A fluid pressure conducting conduit 37 leads to a suitable control valve (not shown) by which fluid pressure may be applied against the piston in the cylinder 36 to draw the piston rod 35 into the cylinder thus swinging the arms 30, 32, 33 and 34 in a counter-clockwise direction about their pivotal support. It will be observed that this counter-clockwise movement of the arm 30 will move the side guide 25 inwardly in strip gripping direction.

A connecting rod member 38 is pivotally attached to the arm 33 and is also similarly connected to an arm 39 mounted to rotate with the arm 27. Thus, any movement which is imparted to the arm 33 and the arm 30 by the air cylinder 36 will also be imparted to the arms 27 and 39. These latter arms, however, will be moved in clockwise direction causing the side guide 24 to move inwardly in strip gripping direction toward the guide 25. In order that the side guides 24 and 25 may have a parallel movement we provide auxiliary supporting arms 40 and 41 which are pivotally carried by brackets 42 and 43 respectively. The arms 40 and 41 carry pins 40' and 41' which are disposed and co-act with slots 42 and 43 in the side guides 24 and 25. Bell-crank arms 44 and 45 are supported for movement with and secured to the arms 40 and 41 respectively. A connecting rod 46 connects the arm 44 with an arm 34, which forms one of the group which includes the arm 30, and a similar connecting rod 47 connects the arm 45 to an arm 48 which is mounted for rotation with and secured to the arm 27.

The above described arrangement of arms and connecting rods provides means whereby the side guides 24 and 25 may be moved toward and away from each other while being maintained in parallel relation perpendicular to the shear blades. By applying compressed air or other suitable fluid under pressure to the cylinder 36 the guides 24 and 25 can be simultaneously moved inwardly to grip the strip and hold it exactly perpendicular to the cutting shears during the shearing operation thus insuring square cut ends.

In the illustrated embodiment of our invention we provide spring means for retracting or withdrawing the guides 24 and 25 from their gripping position when the pressure in the cylinder 36 is released. When the guides 24 and 25 are withdrawn the strip may move freely therebetween without undesirable drag or resistance. To provide the desired degree of adjustment for accommodation of different widths of strip and to furnish the spring force necessary to retract the guides 24 and 25 we employ an adjusting device indicated at A in Figure 1 and shown in detail in Figure 5. This apparatus includes an open-ended cylinder member 49 mounted on the run-out table side 6, a supporting bracket 50, also secured to the same table member 6, and a connecting link 51 which is pivotally secured at one end to an arm 52 mounted for rotation with the arms 41 and 45. The other end of the link 51 is pivotally connected to a spring enclosing member 53. A cap 54 is attached to the member 53 and has an enlarged flange portion 55 having a sliding fit in the cylindrical member 49. A plunger 56 fits in the member 53 and the plunger rod 57 extends out through the end of the cap 54. A spring 58 is normaly maintained under compression within the spring chamber formed by the members 53 and 54 and engages the plunger 56 and the cap 54. The outer end of the plunger rod 57 is threaded, as seen at 59, and has threaded engagement with a nut member 60 rotatably mounted in the bracket 50. The hand wheel 61 is secured to the nut member 60 and it will be seen that rotation of the hand wheel 61 will cause the plunger rod 57 to move axially relative to the cylindrical housing 49. During such movement the plunger rod 57 and the plunger 56 will also move the members 53 and 54 and the link 51.

When the hand wheel 61 is turned to move the link 51 to the right in Figure 5 the side guides 24 and 25 will be moved further apart and such an adjustment would set the apparatus to accommodate a wider strip. By turning the hand wheel 61 the normal spacing between the guides 24 and 25 can be set at any desired value within the limits of the apparatus. Preferably they are so set that, when no pressure is applied to the cylinder 36, the guides 24 and 25 will be far enough apart freely to permit the strip or sheet to pass therebetween.

In the operation of our apparatus, when pressure is applied to the cylinder 36, the side guide supporting linkage will be moved to cause the side guides 24 and 25 to move toward each other. The supporting arm 41 will be moved in clockwise direction and thus a pull will be exerted upon the link 51. As the plunger 56 cannot move because of its support in the fixed bracket 50 the spring 58 will be compressed and the flange 55 of the cap 54 will slide to the left, as viewed in Figure 5. When the pressure in the cylinder 36 is released the compressed spring 58 will act to return the parts to the position shown in Figure 5, thus withdrawing or moving apart the side guides 24 and 25.

In order to prevent buckling of the strip after striking the gauge stop 19 we preferably provide hold-down guide members on the side guides 24 and 25. In Figure 6 a flange 62 is secured to the side guide member 25 just above the normal position of the sheet 64 while travelling along the run-out table. As this guide flange 62 preferably extends along the entire length of the side guide 25, buckling is definitely prevented and accurate and uniform lengths of material are assured. As an alternative to the flange 62 we may provide a plurality of small rollers 65 (see Figure 7) which are supported on shafts extending from the side guide 66. The sheet 67 is prevented from buckling in the same manner as by the flanges 62. It will be understood that each of the parallel side guides will be equipped with hold-down guides.

Figures 8 and 9 illustrate a retractable, pressure-actuated hold-down guide. One of the side guide members is illustrated at 68. A supporting bracket 69 is suitably secured to the side guide 68, as by welding, and a lever arm 70 is pivotally supported on a pin 71 carried by the bracket 69. The upper end of the lever 70 supports an angle member 72 and the hold-down roller 73 is rotatably mounted at the lower end of the member 72. A screw 74, which is preferably provided with a lock-nut 75, is adapted to adjust the working or hold-down position of the roller 73. As illustrated, the screw is adjusted flush with the bottom of the member 72, but it may be adjusted to extend out therefrom, thus raising the working position of the roller 73. The lower end of the lever 70 is pivotally secured to a piston rod 76. Trunnions 77 support the cylinder 78 from the bottom flange of the side guide 68. A spring 79 normally tends to hold the piston 80 in the position shown in Figure 9 in which the roller 73 is lifted out of its working position. The fluid pressure conducting conduit 81 is preferably flexible to permit movement of the side guide and is connected to the fluid pressure supply pipe 37 (Figure 1), and thus it will be observed that the hold-down device of Figures 8 and 9 will be co-ordinated with the operation of the side guides. When fluid pressure is applied from the control valve through the pipe 37 to the cylinder 36 to cause the side guides to grip the work, the same fluid pressure will be applied to the cylinder 78 and will cause the hold-down roller 73 to move from the position shown in Figure 9 to that shown in Figure 8. When the pressure is released the spring 79 will retract the piston rod and swing the arm 70 about its pivot, thus lifting the roller 73 out of position where it might interfere with the free passage of the sheet through the apparatus. It will be understood that a number of these hold-down mechanisms may be secured to each of the opposed side guide members in spaced relation, and that all of the cylinders of the hold-down mechanisms will be connected together and to the same air line and control means as the main cylinder 36 which operates the squaring side guides.

In Figures 10 to 15 inclusive the control mechanism is diagrammatically illustrated. Referring particularly to Figure 10, when the end of the strip 85 strikes the trigger 23 the flag switch 86, which is connected to the trigger 23 through the linkage 87, 88 and 89, closes two electrical circuits. One of these circuits is connected to and energizes the solenoid 90, seen in Figure 11, which in turns moves the four-way control valve 91 to permit fluid under pressure from the supply pipe 92 to be applied to the side guide operating cylinder 36 and the hold-down cylinders 78. This application of pressure will cause the side guides 24 and 25 to close against the sides of the strip and the hold-down rolls 73 to be brought down into the position shown in Figure 8. Of course, if the hold-down guides of Figure 6 are employed the cylinders 78 and their fluid connections will be omitted.

The other circuit which is closed by movement of the trigger 23 and operation of the flag switch 86 is the circuit which starts the shear driving motor 2. Although both circuits are closed at the same time by the switch 86, the side guides will be closed before the shear starts to cut the strip due to the fact that the crank shaft 93 of the shear has to turn approximately 90° before the knives come in contact with the strip. Furthermore, the masses of the shear mechanism which have to be accelerated are considerably greater than the masses which have to be moved in the side guide mechanism and thus the guides will be caused to grip the strip before the cutting operation takes place.

The distance, indicated on Figure 10 at d, between the trigger or flag 23 and the measuring stop 19 is determined largely by the speed of the strip and is set in the field so that the shear will not start cutting until the strip has struck the stop 19. Even if there is a small time interval between the instant that the strip strikes the stop 19 and the instant that the shear knives contact the strip, the accuracy of cut will still be maintained due to the fact that the strip hold-down guides will prevent the formation of a loop between the shear and the stop 19. Any loop that is formed will be pushed back and formed ahead of the shear.

After the shear has started cutting the strip an electrical circuit is closed by the switch 94, which is connected to the shear drive mechanism in any suitable way such as by a cam (not shown). This circuit is connected to the stop operating motor 95 and closing of the circuit by the switch 94 starts the motor 95 which acts through a crank and connecting rod 96 to lift the stop 19 out of the position shown in Figure 12 into that shown in Figure 13. This permits the severed strip to be moved on through the machine by the conveyors 8 and 9. A limit switch 97 is connected to the stop motor 95 and acts to break the circuit to the motor 95 upon completion of a single revolution of the crank which operates the stop 19. Thus, the motor 95 will stop when in the position shown in Figure 14 and the stop 19 will ride upon the surface of the strip which has been severed and is being moved away on the conveyor 8. As soon as the severed end of the strip passes the stop 19 the stop will drop down into the position shown in Figure 15. This action of the stop is permitted by the slot 98 in which the head 99 of the connecting rod 96 has sliding movement.

Just after the shear severs the strip another circuit is broken by the switch 94 which de-energizes the solenoid 90 and a spring (not shown) in the valve 91 moves this valve to shut off the supply of air from the pipe 92 to the cylinders 36 and 78 and permit the springs 58 and 79 to return the side guides and the hold-down rollers to their retracted positions. Still another circuit which is controlled by the switch 94 permits the crank shaft of the shear to make only one revolution in a cycle. The above describes one complete cycle of the machine and it will be understood that this cycle will be repeated continuously, being started by the oncoming end of the strip striking the flag or trigger 23 after each severed piece has been carried away by the conveyors 8 and 9.

The detailed electrical connections and the details of the switch mechanisms are not illustrated herein because they may take any suitable form and are within the knowledge of those skilled in the art.

From the above description it will be seen in the operation of our improved material cutting apparatus the trip 23 will be connected to actuate and set into operation controls which will cause fluid pressure to be applied to the cylinder 36 to move the piston and piston rod 35 into the cylinder and cause the side guides 24 and 25 to be moved inwardly, against the force exerted by the spring 58, to grip the side edges of the strip and maintain the strip perpendicular to the cutting line of the shear. This gripping action is so timed as to take place as or after the end of the strip strikes the gauge stop 19 and just or as before the shear blades 5 sever the piece from the strip. As soon as the piece is severed the fluid pressure in the cylinder 36 is released and the spring 58 will immediately retract the side guides, permitting the cut off piece to be conveyed away by the chains 8 and 9 and permitting a new length of strip to be fed through between the shear blades. In well known manner, the chains 8 and 9 travel at a higher lineal speed than the rate of feed of the strip to the shear. If desired a roller type of run-out table may be employed rather than the chain type shown in the drawings.

As each shearing operation will take place with the material firmly gripped between the parallel side guides and as these side guides are accurately maintained in parallel relation and in a position perpendicular to the shear blades, all of the successive end cuts must be exactly parallel to each other and all of these end cuts must also be exactly perpendicular to the side edges of the sheet. Thus, even though the sheet may have a tendency to angle slightly sideways as it is fed through the shear blades, it will be straightened out by the gripping action of the side guides before the shear cut takes place. Even though the strip be cambered, i. e., have its opposite side edges curved rather than parallel and straight, the pieces being cut off will be so gripped by the side guides that a subsequent trimming operation for straightening the sides will remove a minimum of material while still providing perfectly straight sided rectangular pieces.

Although we have described one embodiment of our invention in considerable detail it will be understood by those skilled in the art that numerous modifications in the arrangement and form of the parts may be made without departing from the spirit of our invention. Furthermore, our improved material cutting system may be applied to other types of shears and used with other forms of gauge stops, etc., than those which we have illustrated, and we do not, therefore, wish to be limited to the particular apparatus herein described but claim as our invention all embodiments thereof coming within the scope of the appended claims.

We claim:

1. In apparatus of the type described, a shear, a shear run-out table, means for conveying material along said table, a pair of spaced parallel side guides adapted to define the sides of the path of material along said table, means for supporting said side guides for parallel movement toward and away from each other, and means for operating said side guides to move them into and out of gripping engagement with the edges of material disposed therebetween in timed relation to the cutting strokes of said shear.

2. In apparatus of the type described, a shear, a shear run-out table, means for conveying material along said table, a pair of spaced parallel side guides adapted to define the sides of the path of material along said table, means for supporting said side guides perpendicular to the cutting line of said shear and for parallel movement toward and away from each other, means for operating said side guides to move them into gripping engagement with the edges of material disposed therebetween, and control means, actuated by movement of the material being sheared, for controlling the gripping movement of said side guide operating means.

3. A shear run-out table of the type described including table supporting members, means for moving material along said table, a pair of side guide members extending longitudinally of said table, means to move said side guides into and out of gripping and squaring engagement with material on said table, and means for controlling the operation of said side guide moving means whereby the guides will grip the material during severing thereof by the shear and release the material after severing.

4. A shear run-out table of the type described including means for supporting and moving material along said table, a side guide member, an arm having a fixed pivotal support, said side guide being pivotally connected to said arm at a point removed from said fixed support, a second pivotally supported arm, means for connecting said second arm to said guide, means for connecting said arms for simultaneous movement, a second side guide, a pivotally supported arm connected to said second side guide, means for interconnecting an arm attached to the first named side guide and an arm attached to the second named side guide, and means for moving one of said arms about its fixed pivotal support whereby simultaneous parallel movement will be imparted to said side guides.

5. A run-out table of the type described including table frame members, means for moving sheet or strip material along said table, a pair of spaced parallel side guides for said material, means for supporting said side guides for movement toward and away from each other while retaining said parallel relation thereof, means for moving said side guides into and out of engagement with the strip, and means operable independently of said side guide moving means for varying the distance between said side guides to accommodate different widths of material.

6. A run-out table of the type described including table frame members, means for moving sheet or strip material along said table, a pair of spaced parallel side guides for said material, means for supporting said side guides from said table frame for movement toward and away from each other while retaining said parallel relation thereof, means for varying the distance between said side guides to accommodate different widths of material, fluid pressure actuated means for moving said side guides in one direction and spring means for moving said guides in the opposite direction.

7. A run-out table of the type described including table frame members, means for moving sheet or strip material along said table, a pair of spaced parallel side guides for said material, means for supporting said side guides from said table frame for movement toward and away from each other while retaining said parallel relation thereof, means for varying the distance between said side guides to accommodate different widths of material, and hold-down guides on said side guides adapted to engage the top surface of the strip and prevent buckling thereof.

8. In apparatus of the type described, a run-out table, means for moving material along said table, a pair of spaced parallel side guides for said material, fluid pressure actuated means for moving said side guides toward each other, means for moving said side guides away from each other, and a hold-down guide mechanism carried by one of said side guides, said hold-down mechanism including a material-engaging member, fluid pressure actuated operating means for moving said material-engaging member in one direction, spring means for moving said material engaging member in the opposite direction and fluid pressure conducting means for supplying actuating fluid pressure simultaneously to both the side guide operating means and the hold-down guide operating means.

9. In apparatus of the type described, a shear, a run-out table, means for moving material along said table, spaced parallel side guides for said material, means for moving said side guides toward and away from each other, hold-down guides carried by said side guides, means for lifting said hold-down guides away from and lowering said hold-down guides into their hold-down positions, independent fluid pressure actuated means for operating said side guides and hold-down guides, and means, operating in timed relation to the operation of said shear, for controlling said fluid pressure actuated means whereby said side guides will be in gripping position and said hold-down guides in hold-down position when a cut is made by said shear.

10. In apparatus of the type described, a shear, a run-out table, means for moving material along said table, spaced parallel side guides for said material, means for moving said side guides toward and away from each other and means, operating in timed relation to the operation of said shear, for controlling said means for moving said side guides whereby said side guides will be in gripping position when a cut is made by said shear.

11. In apparatus of the type described, a shear, a run-out table, means for moving material along said table, a gauge stop for determining the length of piece to be cut, side guides for said material, means for causing said side guides to grip and release the edges of the material, a trigger member adapted to be engaged by the advancing end of the material being handled, means responsive to movement of said trigger member for controlling the operation of said shear, gauge stop and side guides whereby after the end of the material strikes said trigger member and engages the gauge stop the side guides will grip the edges of the material and the shear will then sever the measured length of material.

12. In apparatus of the type described, a shear, a run-out table, means for moving material along said table, a gauge stop for determining the length of piece to be cut, side guides for said material, means for causing said side guides to grip and release the edges of the material, a trigger member adapted to be engaged by the advancing end of the material being handled, means responsive to movement of said trigger member for controlling the operation of said shear, gauge stop and side guides whereby after the end of the material strikes said trigger member and engages the gauge stop the side guides will grip the edges of the material and the shear will then sever the measured length of material, and means for maintaining the strip material in a substantially uniform plane on said table during severing.

WILLIAM RODDER.
ELWIN A. MATTESON.